United States Patent
Wawrzynowski (10) Patent No.: US 7,523,972 B1
(45) Date of Patent: Apr. 28, 2009

(54) PORTABLE WASTE REMOVER WITH INTEGRATED BAG

(76) Inventor: Michael Wawrzynowski, 415 Herondo St., Apt. #32, Hermosa Beach, CA (US) 90254

( * ) Notice: Subject to any disclaimer, the term of this patent is extended or adjusted under 35 U.S.C. 154(b) by 274 days.

(21) Appl. No.: 11/378,120

(22) Filed: Mar. 17, 2006

(51) Int. Cl.
*A01K 29/00* (2006.01)
*E01H 1/12* (2006.01)

(52) U.S. Cl. .................................. 294/1.3; 294/1.4
(58) Field of Classification Search ............... 294/1.3, 294/1.4, 25, 55; 15/104.8, 257.1, 257.6; 119/161

See application file for complete search history.

(56) References Cited

U.S. PATENT DOCUMENTS

| | | | |
|---|---|---|---|
| 4,146,260 A | 3/1979 | Carrington | |
| 5,174,620 A * | 12/1992 | Huegelmeyer et al. | 294/1.3 |
| 5,503,442 A * | 4/1996 | Lee | 294/1.4 |
| 5,540,469 A * | 7/1996 | Albert | 294/1.4 |
| 5,620,220 A * | 4/1997 | Khoshnood | 294/1.3 |
| 5,669,645 A * | 9/1997 | Chuang | 294/1.3 |
| 6,059,332 A * | 5/2000 | Beascoechea Inchaurraga | 294/1.3 |
| 6,076,717 A | 6/2000 | Edwards et al. | |
| 6,223,695 B1 | 5/2001 | Edwards et al. | |
| 6,240,881 B1 | 6/2001 | Edwards et al. | |
| 6,405,683 B1 | 6/2002 | Walter et al. | |
| 6,641,188 B2 | 11/2003 | Arceo | |
| 6,694,922 B2 | 2/2004 | Walter et al. | |
| 6,886,499 B2 | 5/2005 | Meissner | |
| 6,983,966 B2 | 1/2006 | Azrikam | |
| 7,063,365 B1 * | 6/2006 | Chase | 294/1.3 |
| 7,077,443 B1 * | 7/2006 | Jones | 294/1.4 |

FOREIGN PATENT DOCUMENTS

GB    2032831    * 5/1980

* cited by examiner

*Primary Examiner*—Dean J Kramer (57) ABSTRACT

A waste removal apparatus comprising a handle, housing portion for holding and dispensing bags, and a grabbing assembly actuated by a spring and pulley assembly contained in the handle. Grabbing assembly is further coupled to a first and second frame member wherein the frame members are capable of pivotally attaching to the housing portion. In another embodiment the first and second pivot arms have removable clamps that either secure the frame members for grabbing waste or detach from the frame members making them collapsible. In another embodiment, the housing portion is in the shape of a tube with a roller and also having a slotted groove disposed therein wherein disposable bags may be fitted around the roller and dispensed through the slotted groove. In another embodiment, the grabber assembly engaging the handle is comprised of a button, spring, spring arm with shoulder, and toothed elongated arm engaging the frame members.

9 Claims, 15 Drawing Sheets

Fig. 5
SECTION D-D

Fig. 4
SECTION C-C

Detail E
Fig. 6a

PORTABLE WASTE REMOVER WITH INTEGRATED BAG

BACKGROUND OF THE INVENTION

1. Field of the Invention

The present invention relates to a waste removal apparatus. More specifically, the present invention relates to a hand-held, spring-actuated folding arm assembly capable of scooping up waste while securing it in an animal waste bag; a waste removal device with a portable means for carrying and dispensing bags for holding waste; and a waste removal device with a spring actuated leash for securing an animal.

2. Description of Related Prior Art

There are a number of animal waste removal systems currently available. Typically these include some form of apparatus for housing the waste and a handle or other method for opening and closing the waste housing.

U.S. Pat. No. 4,718,707 issued to Greenhut is a common example of waste removal. Using the Greenhut device a person holds the handle and either pushes the waste into the housing or 'sweeps' the housing along the ground to collect the waste. After that is done, the housing can then be sealed for later disposal.

Similarly, U.S. Pat. No. 6,641,188 issued to Arceo utilizes a waste housing attached to a handle incorporating a lever for opening and closing a door in the housing. Further, a bag can be attached and removed from the opposite end of the waste housing to dispose of the waste.

U.S. Pat. No. 4,830,419 issued to Watanabe incorporates a retractable handle for grabbing waste when it is positioned over it.

U.S. Pat. No. 6,983,966 issued to Azrikam discloses a grabbing assembly motivated by a handle trigger that pulls a rod attached to a spring. The spring is then attached to a pair of pivotally attached cranks. When the rod is pulled up by the trigger, the cranks are pulled together and vice versa. A further disclosure by the Azrikam patent is that a standard bag (e.g., a shopping bag) can be fitted around the grabbing assembly. Once the jaws of the grabbing assembly are closed, it incorporates the waste into the bag which can be sealed and disposed of.

Yet, what is not incorporated into the Azrikam patent or any of the other above-referenced patents is an affordable yet portable solution to animal waste removal. The Azrikam patent is too complex to accommodate a more fungible commodity like other removal devices and, does not disclose a means for making waste removal truly portable by incorporating some way for the device to easily hold and use dispensing bags What is needed is a mechanism that easily allows for a truly hand-held, portable device allowing for portable bag dispensing and disposal, retractable scooping assemblies, and simple handle actuating mechanisms.

SUMMARY OF THE INVENTION

In accordance with the present invention, there is provided A waste removal apparatus comprising a handle; a housing portion for holding and dispensing bags and further comprising an extending and retracting grabbing assembly operatively engaging the handle.

A further object of the present invention is to provide a waste removal apparatus comprising a spring tension actuated push handle on the handle portion operatively engaging a cable, pulley, and a spring for actuating pivot arms.

Another object of the present invention is to provide a grabbing assembly comprising frames for coupling to pivot arms and which can pivotally attach to a housing portion.

Another object of the present invention is to provide detachable clamps secured to pivot arms capable of removeably detaching from scooping frame members.

Another object of the present invention is to provide a latch for stopping or releasing a spring tension pulley, cable, and spring mechanism for actuating a grabbing assembly.

Another object of the present invention is to provide housing for holding and dispensing bags comprising a tube with a replaceable roller disposed therein and capable of receiving one or more removable bags fitted around the roller, and a slotted groove in the housing capable of dispensing the bags.

Another object of the present invention is to provide a cable, pulley and spring handle actuator comprised of a push handle arm biased against a push handle, linkage for linking the push handle and push handle arm with a flexible cable, and having the cable operatively engaging a pulley coupled to the handle and operatively engaging a spring.

Another object of the present invention is to provide a vertically positioned handle on a waste removal device having a push handle trigger operatively engaging a grabbing assembly for picking up waste.

Another object of the present invention is to provide a leash housing and assembly for extending and retracting a leash.

Another object of the present invention is to provide a housing portion comprised of a tubular shape and further comprising a roller disposed therein capable of receiving one or more bags fitted on the roller and also having a lid.

Another object of the present invention is to provide clasps on a waste removal device for securing bags onto the device.

Another object of the present invention is to provide a grabbing assembly with a button that engages an arm with an aperture and spring disposed therein biased against a handle housing and, also engaging a spring, and spring arm with shoulder that engages scooping frames.

DETAILED DESCRIPTION OF THE DRAWINGS AND PREFERRED EMBODIMENTS

A complete understanding of this invention can be gained through reference to the drawings in conjunction with a thorough review of the disclosure herein.

Overview

The apparatus and its several embodiments as described herein provide for a portable waste removal device 1 that is capable of picking up animal waste 29 through the use of waste scooping frames 2 actuated by a push handle 8 on a handle 23. The push handle 8 engages a pulley 6 and spring 14 assembly that operate to extend and retract two arms 10 attached to the frames 2. There is also provided a container or tube 22 for holding and dispensing bags 19 and attached to the handle 23. In this way, the bags 19 can be pulled over and held by friction on to the frames 2 allowing for a person to scoop up the waste 29 and enclosing it one of the bags 19 without ever being physically exposed to waste.

Figure 11A:
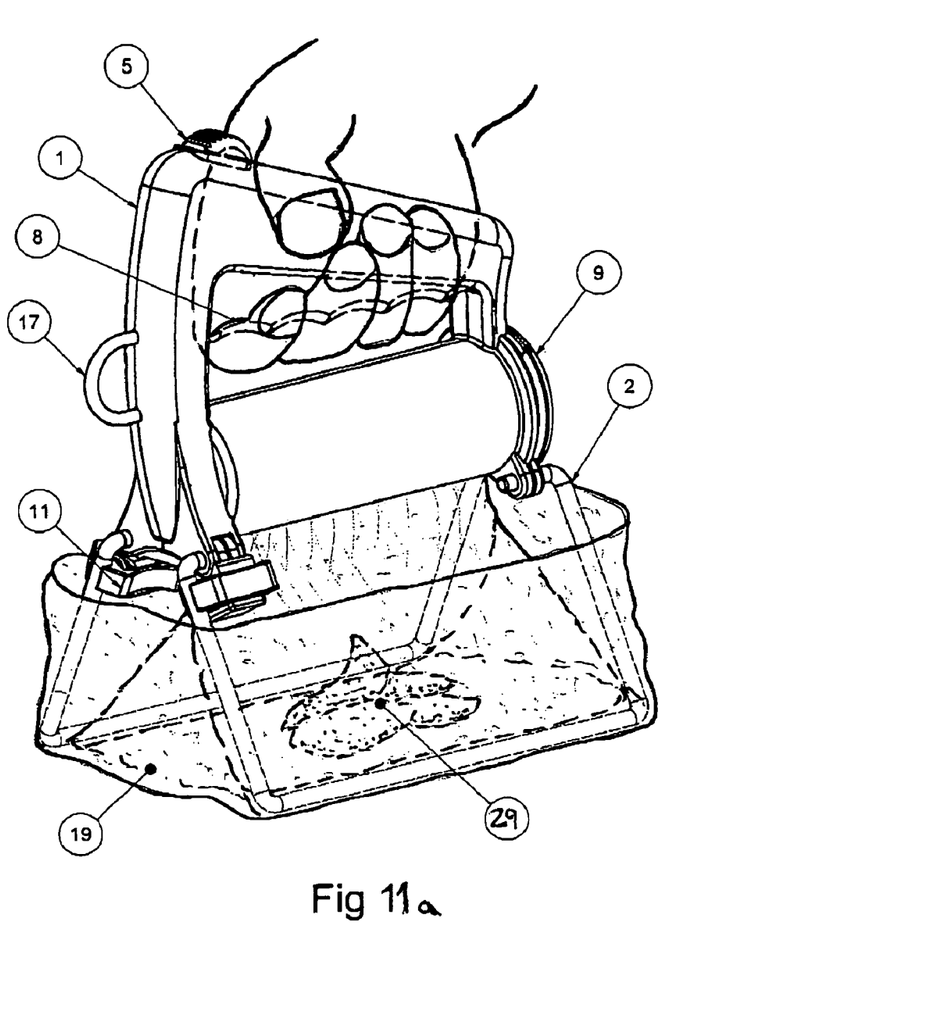
FIG. 11a illustrates a waste removal device where a bag is secured to scooping frames in their extended position.
Figure 11B:
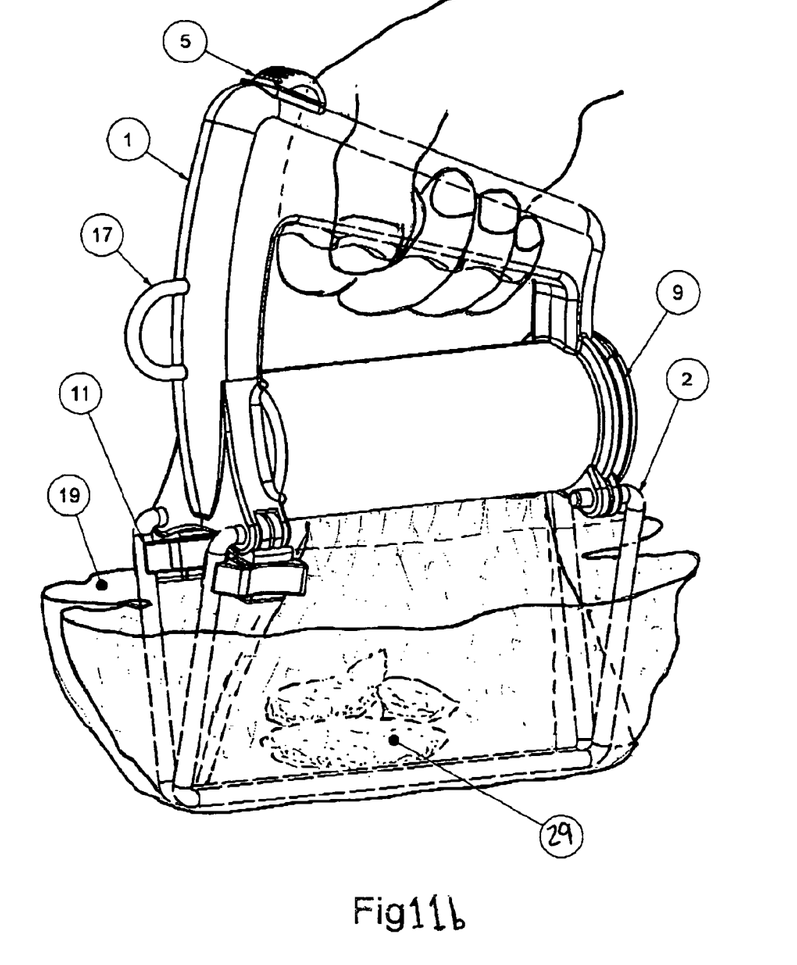
FIG. 11b illustrates a waste removal device where a bag is secured to scooping frames in their retracted position.

Use of the device is illustrated in FIGS. 11a and 11b. FIG. 11a shows a person's hand grabbing and squeezing a push handle 8 thereby actuating an internal spring and pulley assembly that acts to extend or retract scooping frames 2. A bag 19 is dispensed from a tube 22 (FIGS. 4 and 5) and disposed over the frames 2. When the push handle 8 is squeezed the frames 2 are retracted and scoop the waste 29 into the bag 19.

Figure 1:
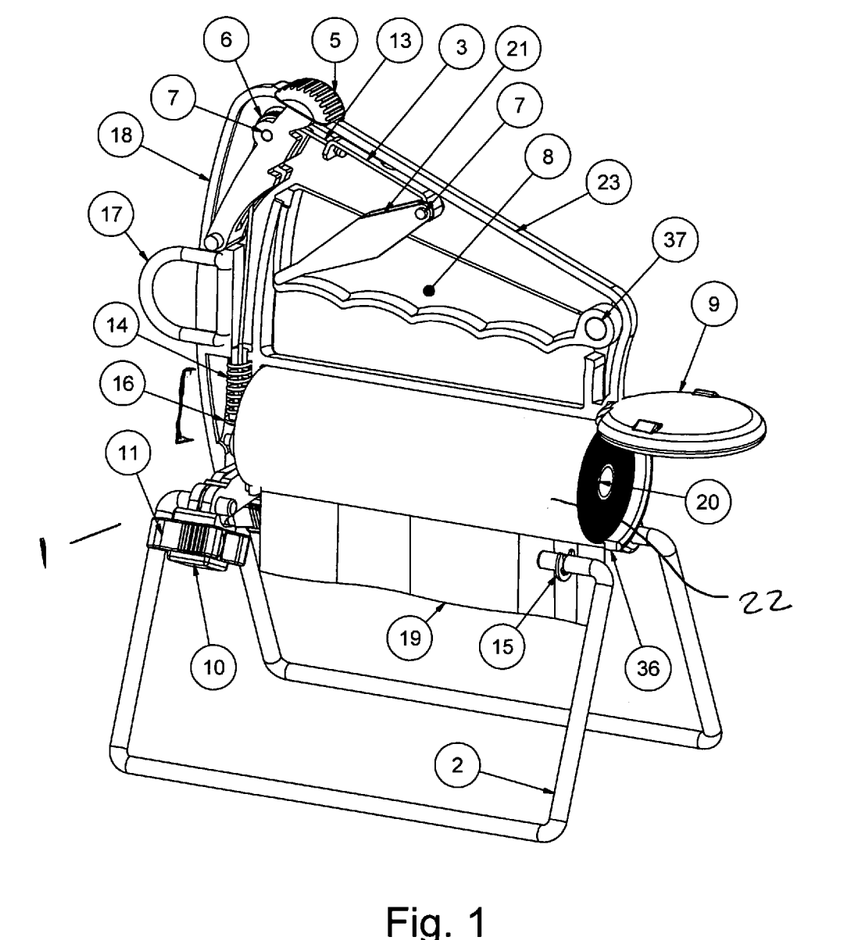
FIG. 1 is a cross-sectional side perspective view of a waste removal device with an extended grabbing assembly.
Figures 6, 6A:
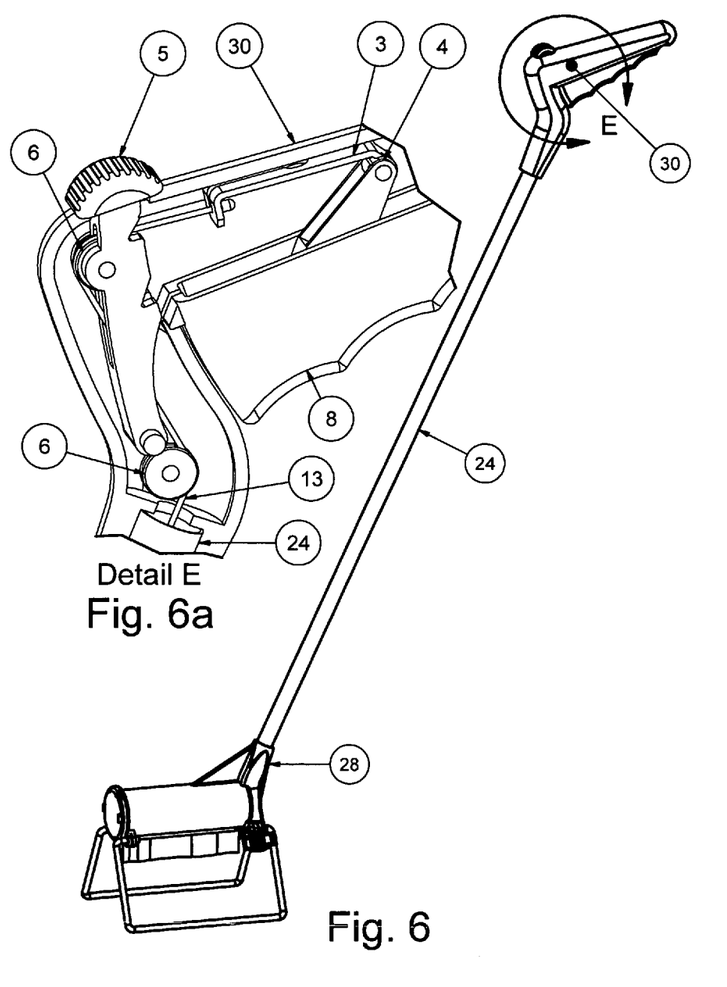
FIG. 6 shows a side perspective view of a waste removal device with an extended rod handle and containing Detail E of a handle.
FIG. 6a shows in Detail E of FIG. 6 a cross-sectional perspective view of internal handle mechanisms for a waste removal device for use with an extended rod handle.
Figure 7:
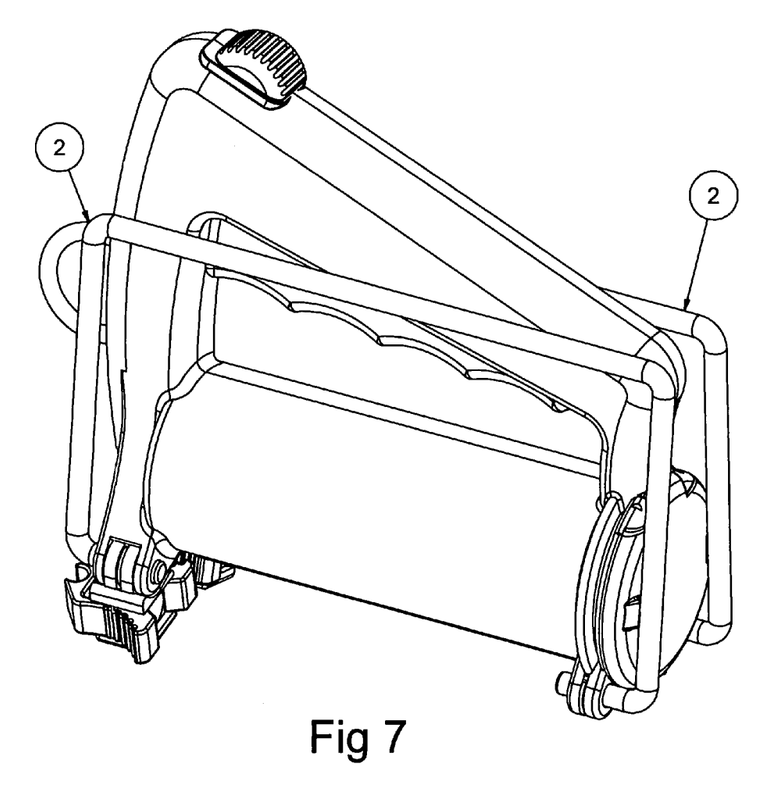
FIG. 7 is an elevated side perspective view of a waste removal device with collapsed scooping frame members.
Figure 8:
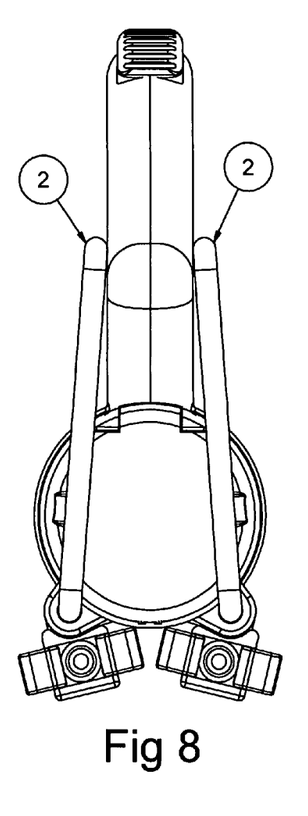
FIG. 8 is front view lateral view of a waste removal device with collapsed scooping frames.

To allow for portability, a handle 23 is shown in FIG. 1 capable of accommodating a human grip. The handle 23 is preferably compact in design as is shown. However, as also shown in FIG. 6a and Detail E of FIG. 6, it can also be comprised of an extended rod that incorporates the same embodiments disclosed herein. The handle 23 of FIGS. 6 and 6a can incorporate the same push handle 8 and related assembly as is contained within the more compact design shown in FIG. 1.

As an added feature, a hook 17 can be molded or attached through known methods to the device on the handle or other appropriate place wherein an animal leash can be secured.

A preferred method for actuating the waste scooping or grabbing assembly of the present invention is through the use of a spring 14 connected to the push handle 8 by way of a cable 13. The spring 14 is mounted to a spring washer 16 composed of a cable axle 25 and a spring washer 26. The spring 14 is either in its stretched (extended position) when no pressure is placed on the push handle 8 or, in its compressed (retracted position) when a person squeezes or otherwise puts pressure on the push handle 8.

Figure 9:
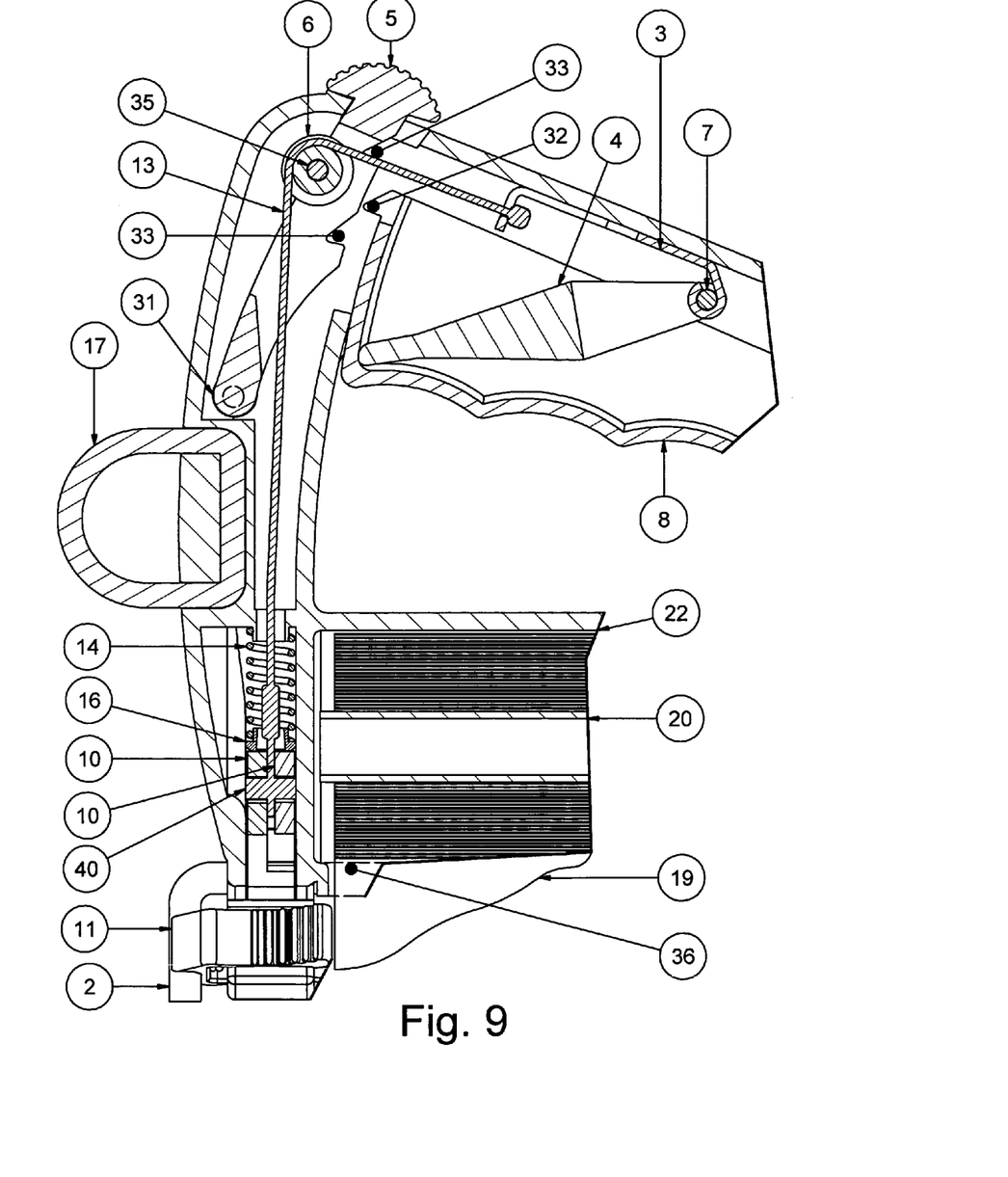
FIG. 9 shows a cross-sectional lateral view of a handle with a cable, spring, and pulley embodiment of a waste removal device for extending and retracting scooping frames.

Because the actuation of the grabbing assembly is done through a cable 13 encased in a compact portable design, a pulley 6 can be used to provide free movement of the cable 13 inside the handle 23 as is shown in FIG. 9 allowing for various handle designs. In this embodiment, a push handle arm 21 is biased against the push handle 8 and the cable 13. This is accomplished by providing a link 3, preferably a lightweight metal, plastic, or other sturdy material, to the push handle arm 21 and link 3 pivoting around a push handle shaft 7. When the push handle 8 is squeezed the arm 21 is forced up thereby pulling the cable 13 and the spring 14 into its extended position.

Similarly, in a design with an extended handle as is illustrated in FIGS. 6 and 6a, a second pulley 6 may be used to accommodate the same spring-actuated movement. In this embodiment the cable 13 is threaded over the first and second pulleys 6, and then down through a handle shaft 28 where it is mounted to the spring washer 16 to provide appropriate tension for the handle 23.

Figure 12:
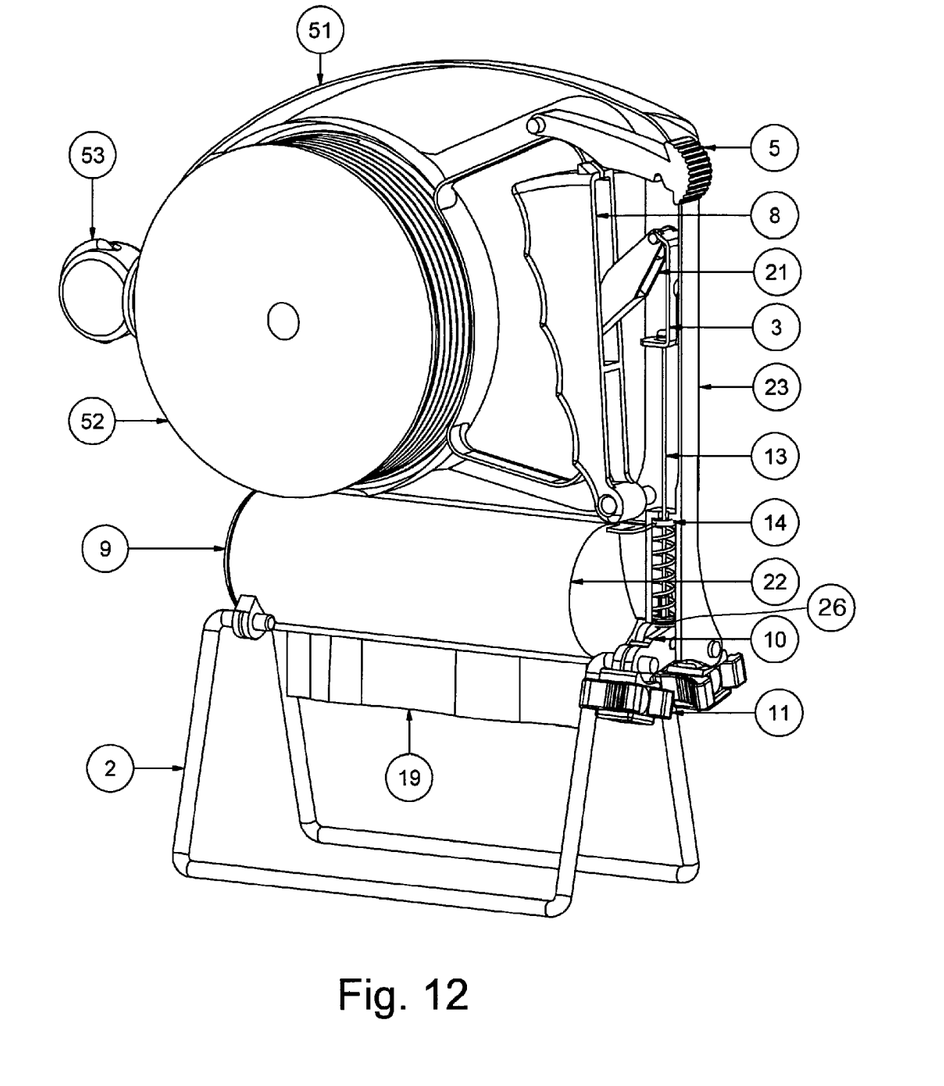
FIG. 12 shows a perspective cross-sectional view of a spring leash assembly and housing used in combination with a waste removal device with a vertical spring actuated handle assembly.
Figure 13:
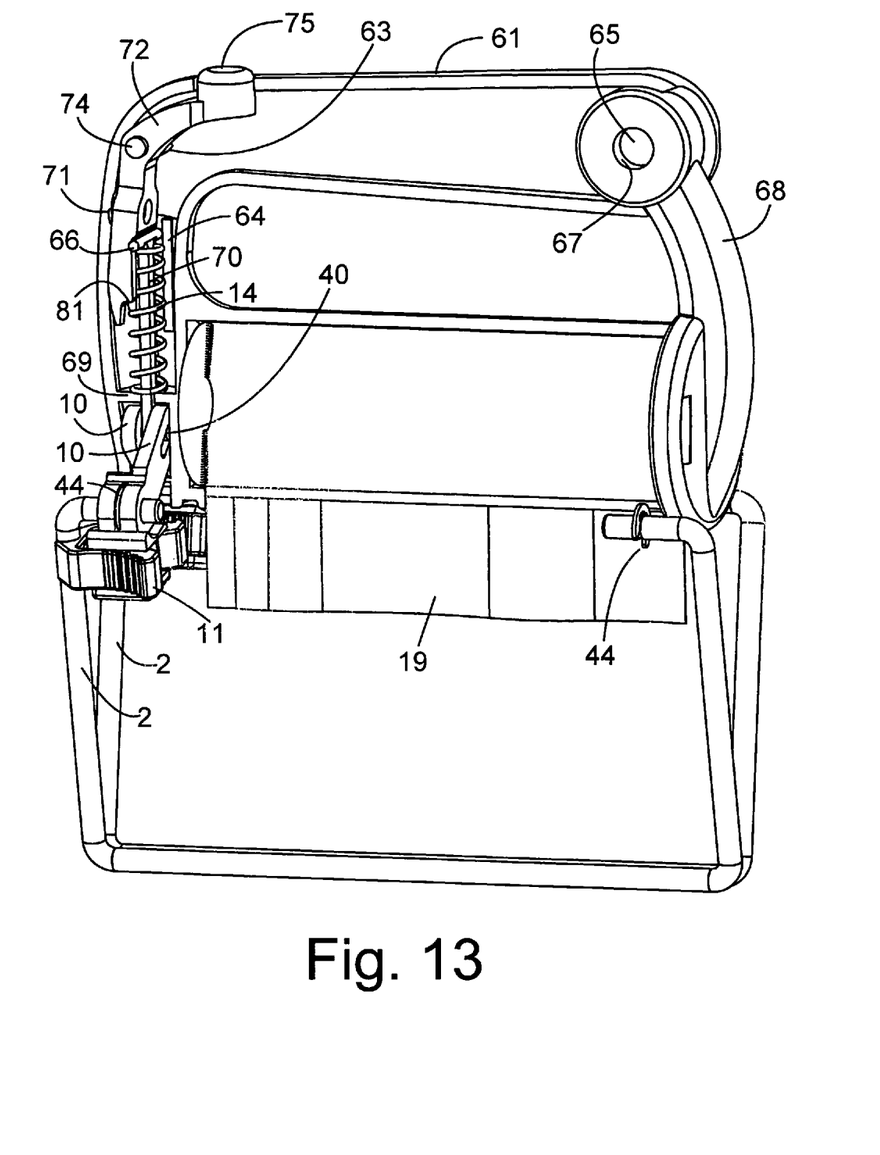
FIG. 13 is a cross-sectional side view of a waste removal device with a loaded spring assembly in a disengaged position.
Figure 14:
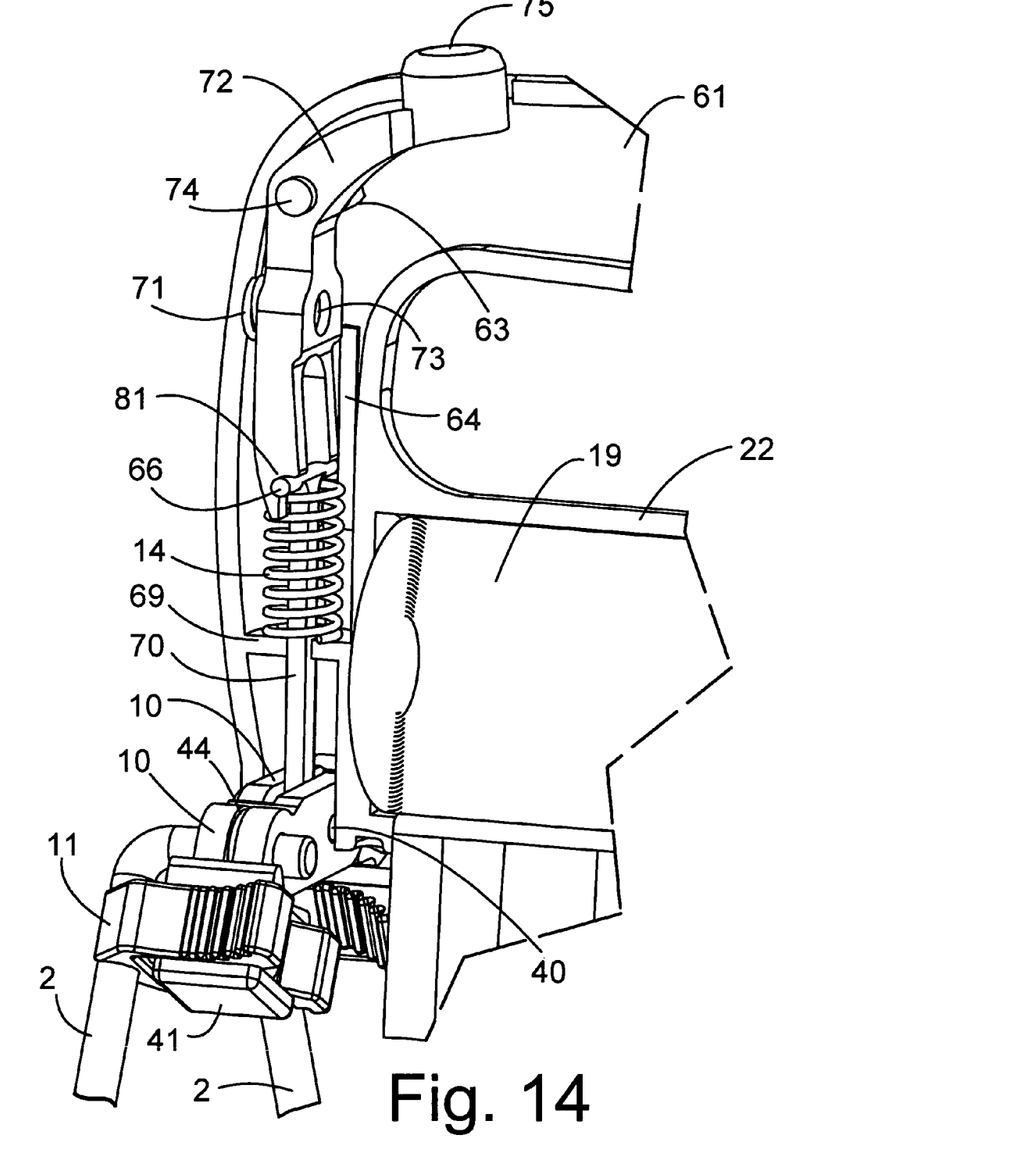
FIG. 14 is a detailed cross-sectional side view of a waste removal device with a loaded spring assembly.
Figure 15:
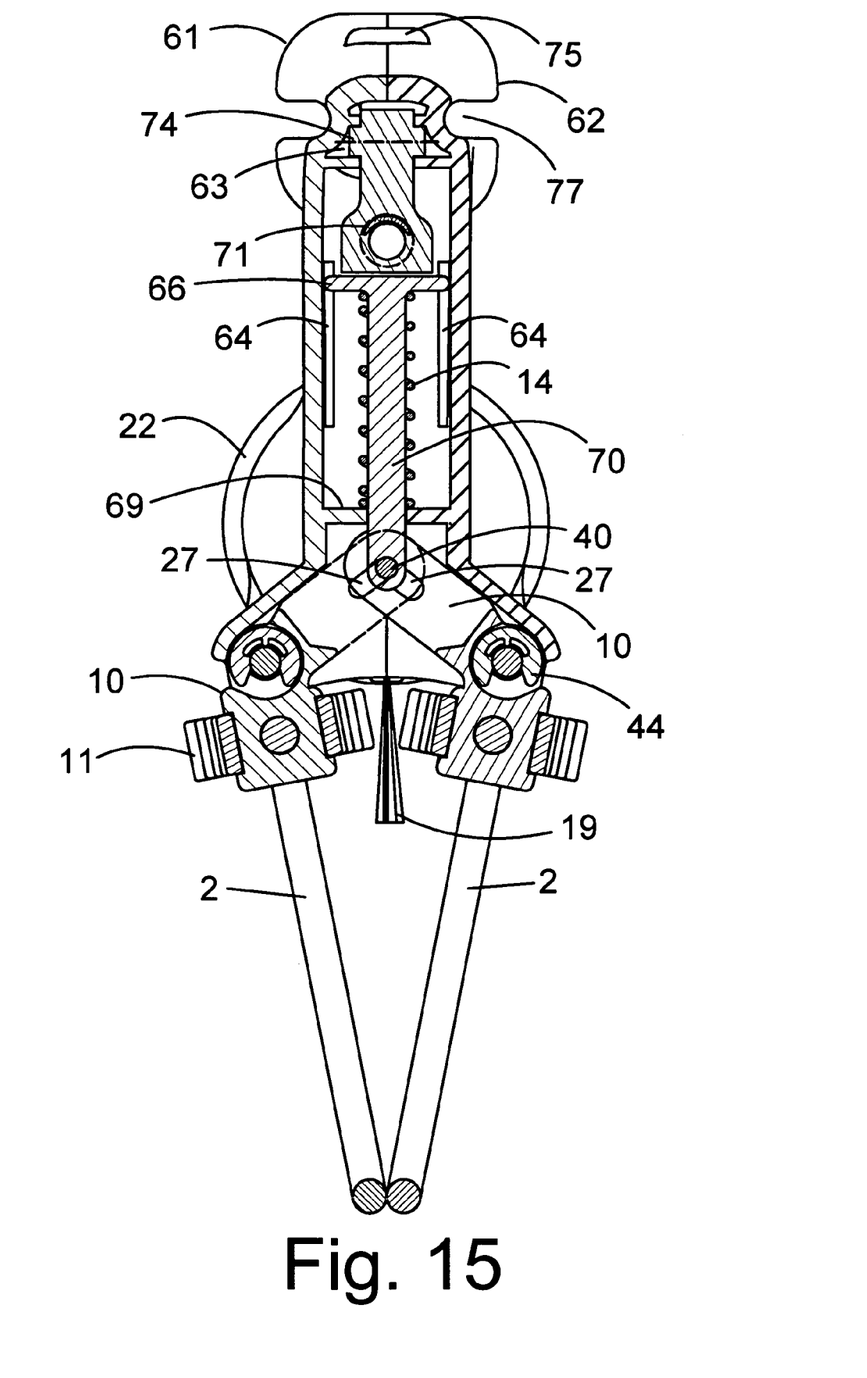
FIG. 15 is a detailed cross-sectional side lateral view of a waste removal device with a loaded spring assembly.
Figure 16:
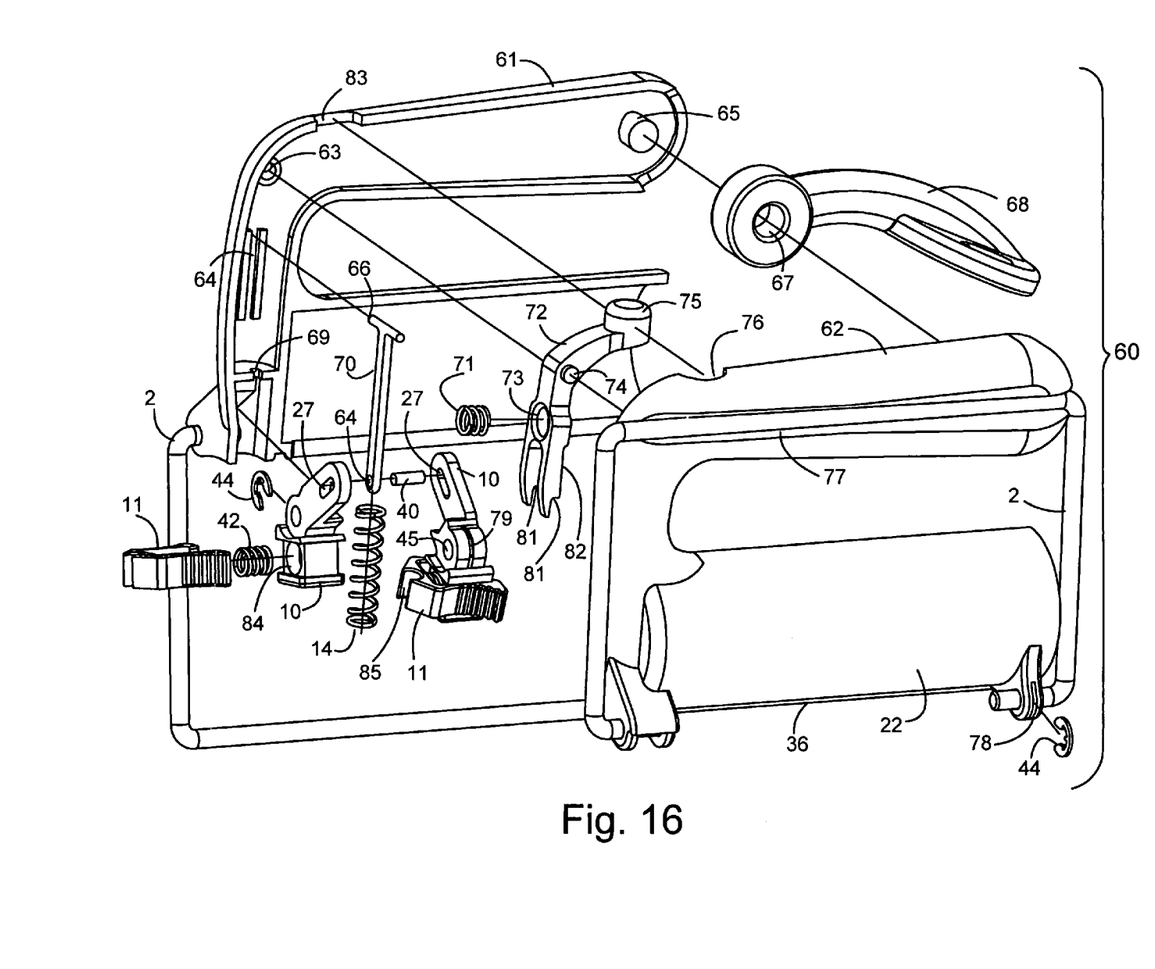
FIG. 16 is an exploded view of a waste removal device with a loaded spring assembly.

In another exemplary embodiment illustrated in FIG. 12, a handle assembly can be situated vertically on the device. In this embodiment, the push handle arm 21 is biased vertically rather than horizontally against the handle shaft 7. The benefit of this embodiment is that a leash housing 51 can be conveniently situated on a forward location on the device to accommodate an animal leash 53.

Figures 10A, 10B:
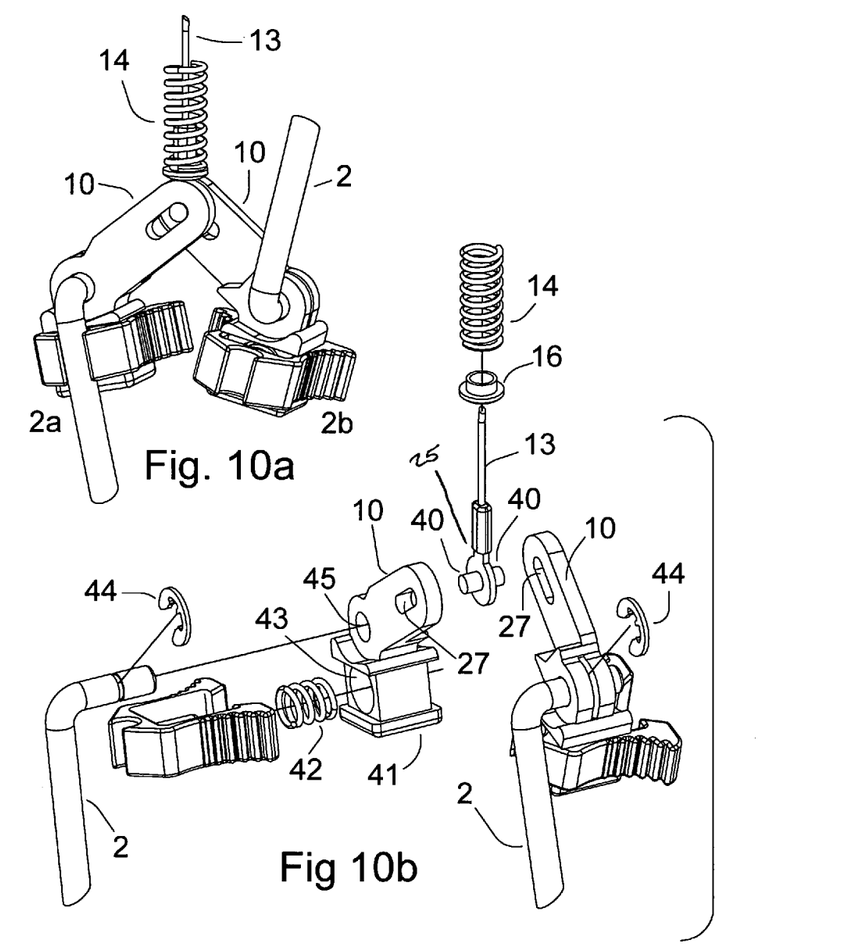
FIG. 10a is a detail view of a collapsible arm assembly using detachable clamps showing one clamp attached to a frame member and another released from a frame member.
FIG. 10b is an exploded view of a collapsible arm assembly using detachable clamps.

Regardless of where the handle 23 is located, the spring 14 mediates the movement of the push handle 8 and the scooping frames 2 by causing their extension and retraction when the push handle 8 is pulled or released. FIG. 10b shows a spring 14 placed around a cable 13 and resting on a spring washer 16 and cable axle 25. The cable axle 25 has two outwardly protruding cable shafts 40 that can be fitted for pivotal movement inside apertures 27 formed at the top of one or more frame arms 10. Each arm is pivotally connected to the cable axle 25 to allow for upward and downward movement. The cable axle 25 is preferably comprised of a sturdy metal or plastic material that can withstand the constant extension and retraction motion of the cable 13 and spring 14.

In an exemplary embodiment shown in FIGS. 1-5 and in detail in FIGS. 10a and 10b, frame arms 10 are capable of extending and retracting when the cable 13 is either pulled or released by the push handle 8. The arms 10 are secured to the cable 13 through two cable arm shafts 40 on each side of the cable axle 25. This is accomplished by having apertures 27 formed in each arm 10 capable of allowing them to pivot around the cable axle 25. The frame arms 10 in this embodiment can be coupled using known methods to scooping frames 2 in a fixed manner thereby causing the scooping frames 2 to extend or retract simultaneously with the movement of the frame arms 10.

In a preferred embodiment, FIGS. 10a and 10b, however, show an alternate embodiment more fully disclosed below, of the scooping frames 2 pivotally secured to the frame arms 10 by being secured inside frame arm apertures 27 on the end of the frame arms 10 and having additional detachable clamps 11 thus, allowing for collapsible frames 10 if desired.

Figure 2:
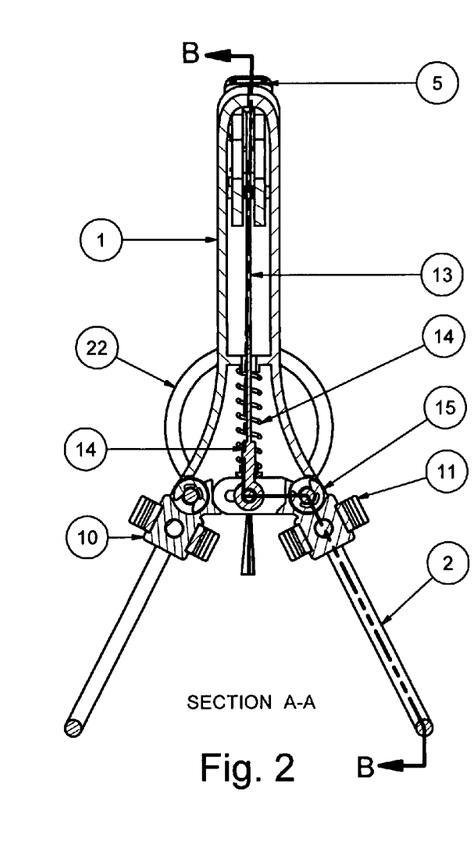
FIG. 2 is a front lateral cross-sectional view of a waste removal device with a grabbing assembly shown in an extended position during movement shown in Section A-A.
Figure 3:
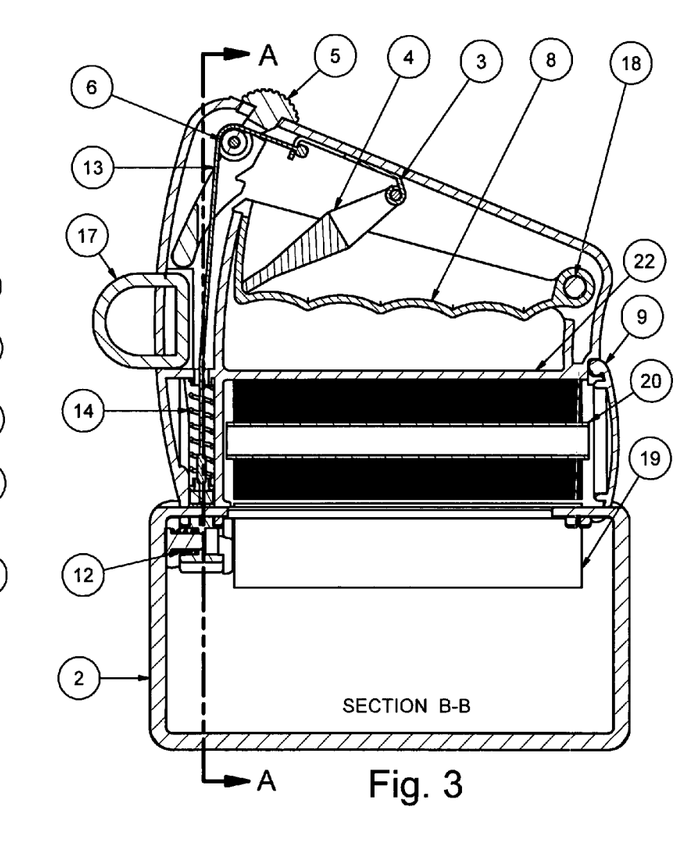
FIG. 3 is a cross-sectional side view of a waste removal device with a grabbing assembly shown in an extended position during movement shown in Section B-B.
Figure 4:
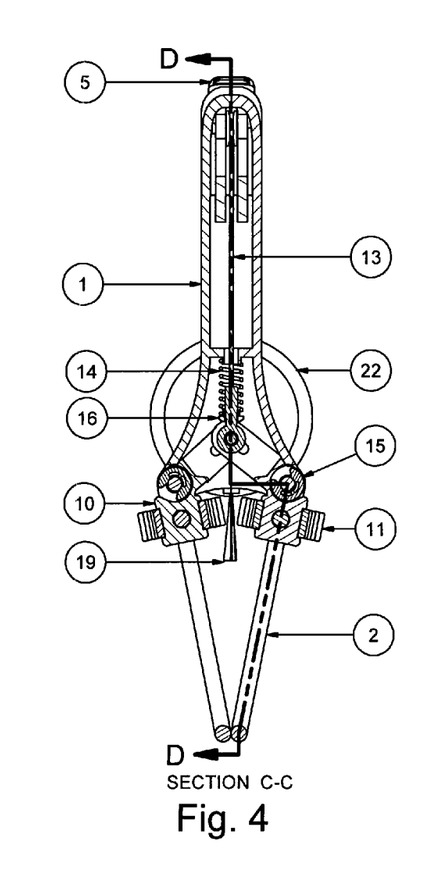
FIG. 4 is a front lateral cross-sectional view of a waste removal device with a grabbing assembly shown in a retracted position as movement shown in Section C-C.
Figure 5:
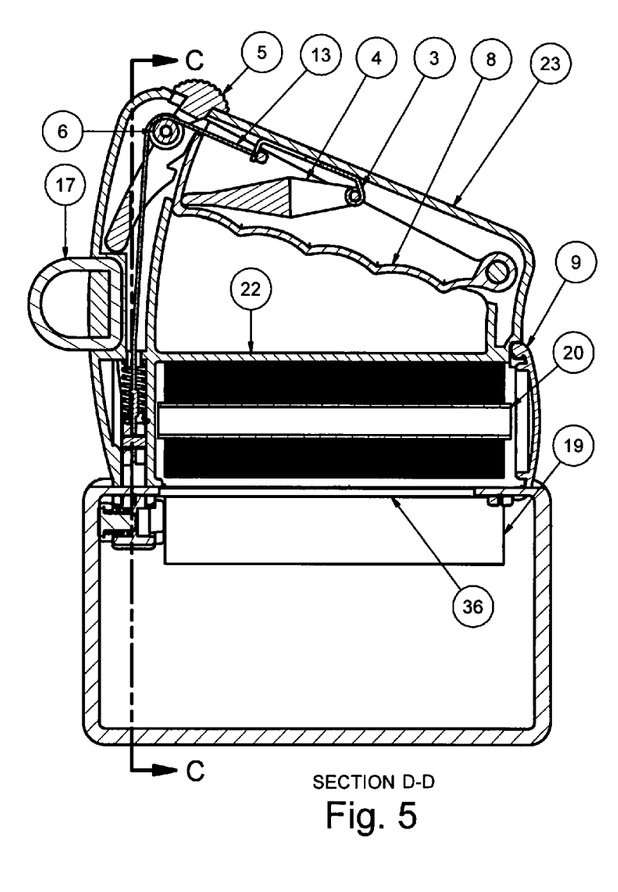
FIG. 5 is a side cross-sectional view of a waste removal device with a grabbing assembly shown in a retracted position as movement shown in Section D-D.

FIGS. 2 (movement B-B) and 3 (movement A-A) and FIGS. 3 (movement D-D) and 4 (movement C-C) illustrate the movement described above. FIGS. 2 and 3 illustrate a retracted cable 13 and an uncompressed spring 14 thereby allowing the frames arms 10 and scooping frames 2 to be in their retracted position because no force is being applied to the spring 14 and frame arms 10 by way of the push handle 8, cable 13, and their linkages. However, FIGS. 4 and 5 show the opposite (movement B-B) where the push handle 8 presses up against the push handle arm 21 (shown in detail in FIG. 9) causing an opposing transfer of movement on the cable 13 thereby pulling the spring 14, (compressed position) frame arms 10, and scooping frames 2 upward. Preferably, spring strength of spring 14 should be less than 1 lb/inch to allow for the push handle 8 to be squeezed by a human hand.

The scooping frames 2 are preferably sturdy wire, plastic, tubular steel, or other known materials that can withstand the constant friction with the ground and are capable of pushing waste into a bag 19. Preferably, they are joined to the device 1 at both the frame arms 10 and to the dispensing container or tube 22. In the case of being joined to the tube 22, this can be done similarly to the joining of the scooping frames 2 to the frame arms 10 by securing the opposite ends of the scooping frames 2 through a bracket pivot 15 attached to the tube 22 to pivotally secure the frames 2 to the tube 22. This is the preferred method because of the added support it provides to the use of the frames 2, although it will be immediately recognized that the scooping frames 2 need only be secured to the frame arms 10 for the device to function. Obvious variations to the frame arms 10 such as toothed frames, pan scoops, or other various shapes used for easily scooping waste may also be used.

In another feature, a thumb latch 5 can be placed on the handle 23 as shown in FIG. 1 and in detail in FIG. 9. One embodiment of the latch 5 comprises a pivoting elongated end 31 with a tooth 33 and a notch 32 on the push handle 8. The latch 5 body extends into the handle 23 and can be placed on its own separate pivot (not shown) or, as shown in FIG. 9, can share a pivot with the pulley shaft 35. In this way, by pushing the thumb latch 5 forward or backward the pivoting elongated end 31 will engage or disengage with the cable 13 by way of the tooth 33 and, through friction or lack thereof, prevents or allows the movement of the cable 13. Therefore, the spring tension of the cable 13 is constantly pushing the latch 5 against the tooth 33 of the handle 8 and there is no need for an extra spring.

In an added embodiment or feature that can be added to the latch 5, a notch 32 can be added to the push handle 8. In this way, when the handle 8 is squeezed towards an upper position, the end of the handle 8 closest toward the notch 32 will lock the handle 8 in place when the latch 5 is pushed forward and released when pushed backward.

As a way of making the frames 2 collapsible, FIGS. 1, and FIGS. 10a and 10b illustrate an embodiment for providing detachable clamps 11 connecting the frame arms 10 with the scooping frames 2 in addition to a pivotal connection of the frame arms 10 with the scooping frames 2. FIG. 10b shows a detailed and exploded view of an exemplary embodiment for using detachable clamps 11 to effect collapsible frames 2. FIG. 10b shows a scooping frame 2 secured in place through the use of a spring biased clamp 11. In this embodiment, a clamp mount 41 is secured to a frame arm 10 and contains a circular mount aperture 43 capable of receiving a clamp spring 42. The clamp 11 is then fitted around the clamp mount 41 through tension. The tension created by the clamp spring 42 pushes and holds the clamp 11 onto the scooping frame 2. A person is then also able to counteract this tension by forcing open the clamp 11 using two protruding tabs that can be placed on the end of the clamps 11.

The scooping frames 2 may also pivotally attach to the frame arms 10 by fitting one end into a circular pivot 45 and securing it to the pivot 45 with a retaining pin 44. In this way, the scooping frames 2 can be detached from the clamps 11 and then folded back over the device 1 when not in use. Various known means for folding the frames 2 upward can be used such as a tension pivot where the frames would be held in an upward or downward position by tension; snaps; or screws, or other pivoting brackets.

As an added and additional novel component to the present invention, a container 22 for storing and dispensing bags 19 may be fitted to it through any number of configurations. (e.g., rectangular, boxed, circular, and etc.) However, in the preferred embodiment disclosed in FIGS. 1-8 a tube container 22 with a bag dispensing slot 36 on the underside of the tube 22 allows bags 19 to be dispensed downward, opened, and pulled over the scooping frames 2 as is shown in FIG. 11. To make dispensing easier, a roller 20 (FIG. 1) may be added whereby a roll of bags can be placed over the roller 20 and pulled through the slot 36.

As an added embodiment, one or more bag clasps, not shown, can be fastened to the scooping frames 2 or on the tube 22 so that a bag 19 can be retained in its place during scooping of the waste. The clasps can be removable and can be made of either a plastic, lightweight metal, or other durable material capable of being formed into a clasp for holding a bag.

To secure the bags 19 in the container, a lid 9 may be supplied as shown in FIG. 1. Any number of shapes, designs, or fastening means may be used to secure the lid. (E.g., hinges, push tabs, form-fitting lids without separate attachment mechanisms, or other known techniques in the relevant art)

FIG. 12 shows an embodiment that may be incorporated into the present invention and as an addition to the embodiments disclosed above. A leash housing 51 with a spring retracting leash spool may also be attached or formed on the present invention and serve as a method for securing an animal. U.S. Pat. Nos. 6,694,922; 6,886,499; and 4,018,189 show acceptable methods for accommodating a portable spool that can be incorporated into the present invention.

In another exemplary embodiment for enabling the activation of scooping frames on the present invention, FIGS. 13-17 illustrate a preloaded spring frame scooping device 60 whereby frames 2 are manually spread apart and locked in place by a shoulder 66 and button arm tooth 81 arrangement engaging a spring 14. In this embodiment, when the frames 2 are spread apart, they pull the arms 10, spring arm 70, and spring 14 down into a compressed position against a spring rest 69. When the spring 14 and spring arm 70 are in the compressed position, the shoulder 66 engages the button arm tooth 81 which prevents the spring 14 and spring arm 70 from recoiling. When a person wants to close the frames, a button 75 actuated around a button arm pivot 74 is pressed which disengages the button arm tooth 81 from the shoulder 66 thereby closing the frames 2.

To ensure that the button arm tooth 81 engages the shoulder 66, a separate button spring 71 is disposed within a button arm aperture 73 and biased against the button arm 72 and the interior of the handle housing 61. In this way, when the spring 14 is compressed by the spreading of the frames 2 and the shoulder 66 reaches the button arm tooth 81, tension against the handle housing 61 by the button spring 71 forces the button arm tooth 81 over the shoulder 66 thus locking the frames in an open position. When the button 75 is pushed, tension is released thereby disengaging the tooth 81 from the shoulder 66 and the frames 2 close.

Figure 17:
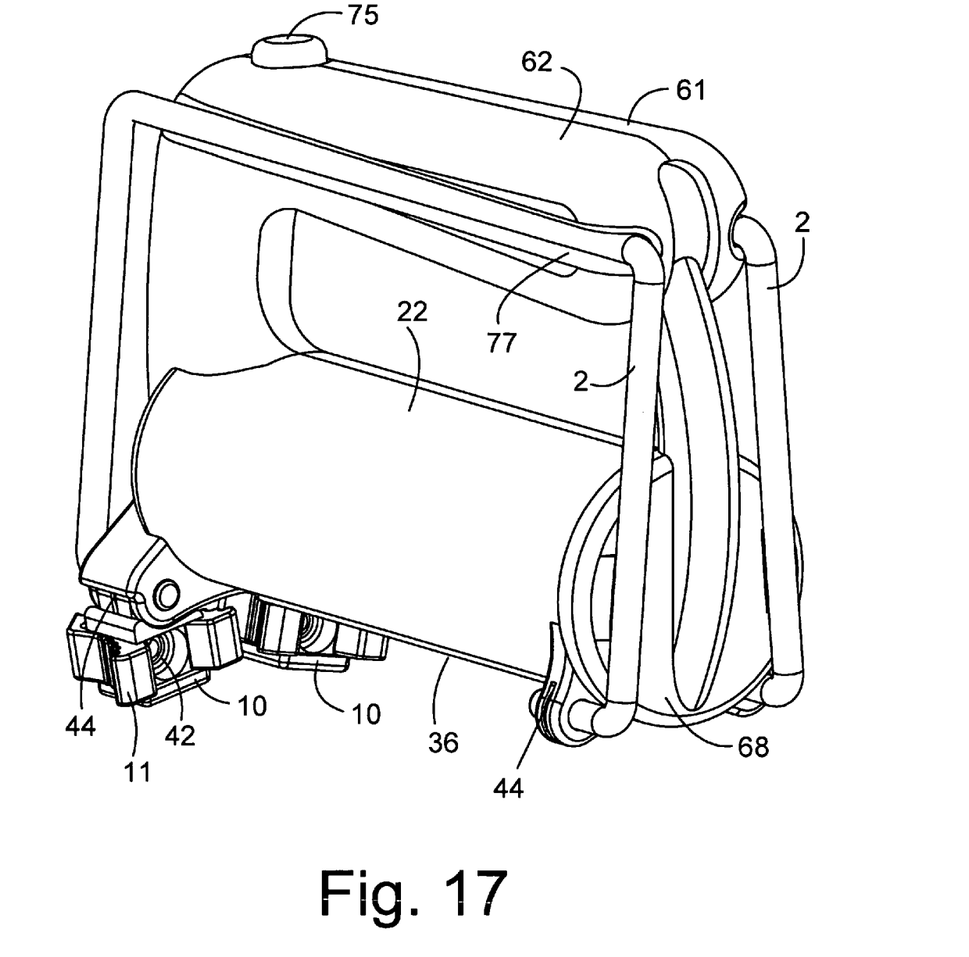
FIG. 17 is rear perspective view of a waste removal device with a loaded spring assembly with frames in a collapsed position.

As an added embodiment, a lid 68 with a lid pivot 65 shown in FIG. 17 may be mounted to the handle wherein the lid 68 can be fitted around a bag dispenser.

CONCLUSION, RAMIFICATIONS, AND SCOPE

While the above description contains various preferred, exemplary, and other specific embodiments, these should not be construed as limitations on the scope of the invention, but as exemplifications of the presently preferred embodiments thereof. Many other ramifications and variations are possible within the teaching of the invention.

Thus the scope of the invention should be determined by the appended claims and their legal equivalents, and not solely by the examples given.

I claim:

1. A waste removal apparatus comprising:
   a handle;
   a housing portion with a slot therein, disposed toward a grabbing assembly, for dispensing bags directly onto the grabbing assembly;
   a means for coupling to the handle; and
   the handle further comprising a means for extending and retracting the grabbing assembly operatively engaged therewith;
   the means for extending and retracting the grabbing assembly comprises a push handle operatively engaged with a cable, a pulley, and a spring means for operatively engaging a first pivot arm and a second pivot arm;
   the grabbing assembly further comprising a first frame member and a second frame member with a means for coupling to the first pivot arm and the second pivot arm and with a means for pivotally attaching to the housing portion.

2. The waste removal apparatus of claim 1 wherein:
   the means for coupling to the first and second pivot arms comprises a detachable clamping means secured to the first and second pivot arms capable of removeably detaching from the first and second frame members; and
   the handle further comprising a latch with a means for actuating the means for extending and retracting the grabbing assembly.

3. The waste removal apparatus of claim 2 wherein the housing portion for dispensing bags comprises a tube with a replaceable roller disposed therein and capable of receiving one or more removable bags fitted around the roller, and a slotted groove in the housing portion capable of dispensing the bags.

4. The waste removal apparatus of claim 1 wherein:
   the cable, the pulley and the spring means comprise a push handle arm biased against the push handle, a linkage means for linking the push handle and push handle arm with a flexible cable, and the cable operatively engaged with a pulley coupled to the handle and operatively engaged with the spring means; and
   the handle further comprising a latch with means for actuating and stopping the cable.

5. The waste removal apparatus of claim 4 wherein the means for coupling to the first and second pivot arms comprises a detachable clamping means secured to the first and second pivot arms and capable of removeably detaching from the first and second frame members.

6. The waste removal apparatus of claim 5 wherein the housing portion comprises a tube with a roller disposed therein capable of receiving one or more removable bags fitted on the roller to be dispense through said slot.

7. The waste removal apparatus of claim 1 wherein:
   the means for extending and retracting the grabbing assembly comprises a push button operatively engaged with a toothed elongated arm, spring, spring arm with a shoulder, and having an aperture disposed on the elongated arm with a button spring biased against the housing portion;
   the grabbing assembly further comprising a first frame member and a second frame member with a means for coupling to a first and second pivot arm and said first and second pivot arms having means for operatively engaging the spring arm;
   the means for coupling to the first and second pivot arms comprises a detachable clamping means secured to the first and second pivot arms capable of removeably detaching from the first and second frame members;
   the handle further comprising a lid pivot operatively engaging a lid capable of fitting around one end of the housing portion; and
   said housing portion is comprised of a tubular shape with a slotted groove and a roller disposed in the housing portion capable of receiving a roll of bags and dispensing said bags through the slotted groove.

8. A waste removal apparatus comprising:
   a vertically positioned handle having a push handle trigger;
   the push handle trigger operatively engaging a push handle shaft and a means for linking to a flexible cable;
   the cable operatively engaging a pulley, and a spring with means for pivotally engaging a first and second pivot arm;
   the first and second pivot arms pivotally engaging first and second frame members and also having means for removably securing to the first and second frame members;
   a latch means on the handle for stopping and releasing the movement of the cable;
   a housing portion operatively engaging the handle and capable of receiving one or more removable bags, a slotted groove in the housing portion capable of dispensing the bags; and
   a leash housing with means for extending and retracting a leash.

9. The waste removal apparatus of claim 8 wherein:
   the latch means comprises a thumb latch trigger and latch arm capable of engaging the cable causing its movement to stop or disengaging the cable allowing the cable to move;
   the means for removably securing to the frame members comprises clamps with releasing tabs and having spring tension means for engaging the frame members;
   the housing portion is comprised of a tubular shape and further comprises a roller disposed therein capable of receiving one or more bags fitted on the roller and having a lid means;
   the leash housing further comprises a rolled leash on a leash roller and a leash stopper with means for operatively engaging with the leash; and
   clasping means for securing a bag onto the device.

* * * * *